United States Patent Office 3,598,791
Patented Aug. 10, 1971

3,598,791
PROCESS FOR THE PREPARATION OF REACTION PRODUCTS FROM α,α-DIHYDROCARBYL-β-PROPIOLACTONE AND ORGANIC HYDROXYL COMPOUNDS
Willem H. M. Nieuwenhuis and Johannes W. J. Koop, Amsterdam, Netherlands, assignors to Shell Oil Company, New York, N.Y.
No Drawing. Filed July 25, 1969, Ser. No. 845,093
Claims priority, application Great Britain, Aug. 5, 1968, 37,168/68
Int. Cl. C08g 17/017, 17/02; C09d 5/02
U.S. Cl. 260—78.3     5 Claims

ABSTRACT OF THE DISCLOSURE

Compounds characterized by the presence of a quaternary carbon atom adjacent to a carboxyl group are prepared by the reaction between an α,α-dihydrocarbyl-β-propiolactone and organic hydroxyl compounds. The compounds are resins or resin intermediates useful in lacquers or paints that can be applied by electrodeposition from aqueous solutions or dispersions. The compounds exhibit improved stability to hydrolysis.

---

This invention relates to a process for the preparation of reaction products from α,α-dihydrocarbyl-β-propiolactones and organic hydroxyl compounds at least one non-phenolic carbon-bound hydroxyl group. More especially the invention concerns those processes of the said type in which the reaction between the lactone and the hydroxyl compound is an addition reaction carried out at a temperature within the range of 50 to 175° C. The addition reaction is carried out in the absence of any alkaline catalyst in order to prevent the formation of undesirable β-hydroxy ester groups.

The invention relates to the preparation of compounds having one or more structural units of the formula

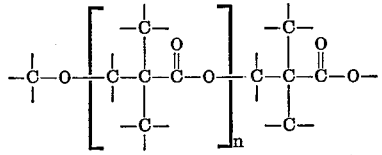

in which n is zero or an integar from 1 to 20, the terminal carbonyloxy group is part of a neutralized or non-neutralized carboxyl group, and the carbyloxy group originates from a hydroxyl group of a compound having at least one non-phenolic carbon-bound hydroxyl group. Depending on whether the carbyloxy groups are attached to a low molecular weight moiety or to a macromolecular part, the reaction products obtained are considered as intermediates for macromolecular compounds or as macromolecular products themselves.

The compounds which are the products of the process of the present invention and the macromolecular products prepared from these compounds as intermediates exhibit an increased stability against hydrolysis. This increased stability is exhibited by the compounds of the above formula when n=0 or an integer. It may be that this increased stability of the compounds against hydrolysis is due to the presence of a quaternary carbon atom adjacent to a carbonyl group. Because of this increased stability against hydrolysis, the resins or resin intermediates of the present invention are particularly useful in lacquers or paints that can be applied by electrodeposition from aqueous solutions or dispersions of the resins in a neutralized state.

Another advantage of the present invention is that the addition reaction between the β-propioleactone and the hydroxyl compound proceeds without substantial undesirable side reactions. Thus because of the presence of the two hydrocarbyl groups attached to the α carbon of the β-propiolacetone no substantial esterification of hydroxyl groups of the hydroxyl compounds with carboxyl groups of the acids formed takes place. Thus the process of the present invention can be conducted at a relatively high temperature with a relative high reaction rate.

The invention also relates to the reaction products obtained by the present process, and to the lacquers or paints prepared therefrom. In addition, the scope of the invention includes a process for the production of coated articles by using such lacquers or paints, and the resulting coated articles as well.

The process according to the invention is described as a process for the preparation of compounds having at least one structural unit of the formula

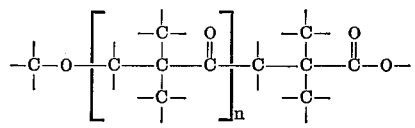

in which n is zero or an integer from 1 to 20 and the terminal carbonyloxy group is part of a neutralized or non-neutralized carboxyl group, which process comprises carrying out an addition reaction between an α,α-dihydrocarbyl-β-propionlactone and an organic hydroxyl compound having at least one non-phenolic carbon-bound hydroxyl group. The process is conducted at a temperature within the range of 50 to 175° C. and in the absence of an alkaline catalyst. The process can be performed in the presence of an acid catalyst, however the process is preferably carried out in the absence of any catalyst.

The organic hydroxyl compounds useful in this invention are those compounds having at least one non-phenolic carbon-bound hydroxyl group. In other words the suitable hydroxyl compounds are those organic compounds having at least one OH group attached to carbon atoms having no benzenoid unsaturation bonded thereto. Those compounds having at least two such hydroxyl groups are preferred. The hydroxyl compounds are macromolecular or non-macromolecular in character.

Suitable examples of macromolecular hydroxyl compounds include alkyd resins, hydrolyzed polyepoxides and esterified polyepoxides. These macromolecular hydroxyl compounds can be used in weight ratios of 5 to 100 parts by weight of lactone per 100 parts by weight of hydroxyl compound. Preferably weight ratios of 10 to 30 parts of lactone per 100 parts of hydroxyl compound are used.

Suitable non-macromolecular hydroxyl compounds useful in the present process include alocohols having at most 20 carbon atoms. Preferably the non-macromolecular compounds are those having at least two non-phenolic hydroxyl groups and up to 12 carbon atoms. Examples of preferred compounds are ethylene glycol, glycerol, 2,2-bis(hydroxymethyl)butanol (trimethylolpropane) and mixtures of the latter compound with up to 75% m. of 2,2 - bis(hydroxylmethyl) - 1,3 - propane diol (pentaerythritol). These alcohols are reacted with the lactone in ratios of 0.1 to 3.0 moles of lactone per non-phenolic hydroxyl group of the hydroxyl compounds. The preferred ratio is 0.5 to 1.5 moles of lactone per non-phenolic hydroxyl group.

The preferred α,α-dihydrocarbyl-β-propiolactone used in the process according to the invention is a α,α-dimethyl-β-propiolactone (pivalolactone).

If hydroxyl compounds of the macromolecular type are used for the addition reaction, the final reaction mixture usually has a rather high viscosity. These reaction mixtures are preferably dissolved in an organic solvent.

A suitable solvent is a 2-alkoxy-ethanol such as 2-butoxy-ethanol. These reaction mixtures either in the dissolved state or not can be neutralized by means of an amine, ammonium hydroxide or an alkali metal hydroxide, such as KOH or NaOH. Preferably the neutralization is carried out with a secondary or tertiary amine, such as diethylamine, diisopropylamine, triethylamine, diethanolamine, triethanolamine, and 2-dimethylaminoethanol. The products thus obtained are water-soluble or dispersible in water, and the resulting aqueous solutions or dispersions are useful for the preparation of lacquers or paints which can be applied by electrodeposition. These aqueous solutions or dispersions are prepared by adding water before, during or after the neutralization.

If the products of the reaction between the macromolecular-type hydroxyl compound and the lactone are to be used as lacquers or paints, the products are preferably mixed with a phenol-aldehyde resin or an amino-aldehyde resin. Usually such mixtures are prepared by blending an aqueous solution or dispersion of a neutralized reaction product with the aldehyde resins at weight ratios within the range of 40:60 to 90:10. Preferred aldehyde resins are those which are water-soluble or dispersible in water. A polyalkyether of a polymethylol melamine, such as hexamethoxy methylmelamine, is a preferred aldehyde resin for this purpose.

After the lacquer or paint compositions, which in case of paints also comprise pigments, have been applied either by means of electrodisposition or by other known methods, the coatings of the lacquers or painted articles thus obtained are baked or cured. In general, the temperature for this curing is within the range of 100 to 250° C. The preferred temperature range for curing is 130 to 190° C. when blends with phenol-aldehyde or amino-aldehyde resins are used.

The products from the addition reaction of non-macromolecular alcohols and lactone mainly comprise $\beta$-carbyloxycarboxylic acids which have a relatively low molecular weight and which are branched at the $\alpha$-carbon atom. These products, which are to be regarded as resin intermediates, can be converted into valuable resins by reaction with a resin-forming compound as defined hereinafter at a temperature within the range of 175 to 260° C. and at a ratio of total number of carboxyl groups to total number of moles of the reactants within the range of 0.4 to 1.6.

In this invention resin-forming compounds are compounds having at least one carboxyl group, at least two carbonyl-forming groups, or at least two hydroxyl groups or hydroxyl-forming groups, or mixtures of two or more of such compounds. Examples of carbonyl-forming groups are carboxylic anhydride groups of mono or polycarboxylic acids. Examples of hydroxyl-forming groups are epoxy groups of polyepoxides and the epoxy groups of the glycidyl esters of a mixture of $\alpha$-branched saturated monocarboxylic acids having 9 to 11 carbon atoms.

Specific examples of resin-forming compounds are polyols, polycarboxylic acids and polycarboxylic anhydrides, such as adipic acid, phthalic anhydride, glycerol, 2,2-bis(hydroxymethyl)butanol, 2,2-bis(hydroxymethyl)-1,3-propane diol (pentaerythritol), 2,2,6,6-tetrakis-(hydroxymethyl)-4 oxaheptane-1,7-diol (dipentaerythritol), 1,2,3,4,5,6-hexanehexol or mixtures of two or more of these alcohols. Divalent alcohols, such as ethylene glycol, diethylene glycol, the butane diols or 2,2-dimethyl-1,3-propane diol (neopentyl glycol) can also be used together with the above polyvalent alcohols. In addition, non-drying, semi-drying or drying oils, such as coconut oil, castor oil, soybean oil, or linseed oil, or mixtures of such oils or their reesterification products with polyols can be used in this invention. Instead of the oils or their reesterification products fatty acids from natural oils, synthetic fatty acids or fatty acids obtained by hydrogenation, dehydration or dimerization can be used. Thus the fatty acids or fatty acid mixtures obtained from the oils mentioned above, hydrogenated ricinoleic acid and the fatty acids obtained from paraffin hydrocarbons are suitable. Other monocarboxylic acids, such as benzoic acid, tertiary butylbenzoic acid and rosin acids, can be employed in addition to the fatty acids.

The reaction of the resin intermediates with the resin-forming compound at 175 to 260° C. is carried out to the desired acid value. The reaction can be continued until the acid value is within the range of 50 to 200 meq./100 g. of reaction mixture in which case the ratio of total number of carboxyl groups to total number of moles of the reactants is preferably in the range of 1.0 to 1.3. If the reaction is to be continued until the acid value of the reaction mixture is only within the range of 0 to 50 meq./100 g. the preferred ratio of total number of carboxyl groups to total number of moles of the reactants is within the range of 0.6 to 1.0. Resins which are very stable against hydrolysis are prepared by a reaction between a mixture of the low-acid-value type (such as an alkyd resin having carbon-bound non-phenolic hydroxyl groups) with a further amount of an $\alpha,\alpha$-dihydrocarbyl-$\beta$-propiolactone, this reaction being carried out at a temperature of, again, 50 to 175° C.

The following examples illustrate the present invention:

EXAMPLE I

Phthalic anhydride in an amount of 148 parts by weight, 136 parts of 2,2-bis(hydroxymethyl)-1,3-propanediol, 32 parts of 2-methyl-3-oxahexane-1,5-diol, 59 parts of glycidyl esters of a mixture of $\alpha$-branched alkanoic acids with 9 to 11 carbon atoms per mole and 38 parts of xylene were added to a flask equipped with a Dean and Stark assembly and a dropping funnel. The resulting solution was stirred and heated to 230° C. for about 4 hours under a stream of nitrogen. The temperature of the solution was then raised to 250° C. for 0.5 hour while the nitrogen stream was maintained.

The acid value of this reaction mixture was 9 meq./100 g., the hydroxyl content being 685 meq./100 g. The temperature was then decreased to 140° C. and 89 parts by weight of $\alpha,\alpha$-dimethyl-$\beta$-propiolactone were added. After a reaction period of 2 hours at 140° C. the acid value of the reaction mixture was 118 meq./100 g. The reaction mixture was then diluted with 111 parts by weight of 2-butoxy-ethanol, and 19 parts by weight of the mixture was combined with 1.8 parts by weight of triethyl amine and 80 parts of water. The resulting clear aqueous solution, stored at 40° C. did not show any phase separation within a period of 2 months.

EXAMPLE II

In the apparatus described in Example I were added 160 parts by weight of a product having a hydroxyl content of 536 meq./100 g. obtained by hydrolysis of an epoxy resin having an epoxide equivalent of 450 to 500 and a Durran melting point of 64 to 74° C. The product was stirred and heated to 140° C. under a stream of nitrogen. Subsequently, 40 parts by weight of $\alpha,\alpha$-dimethyl-$\beta$-propiolactone were added and the temperature maintained at 140° C. for 3 hours.

The reaction mixture, which had an acid value of 78 meq./100 g., was diluted with 50 parts by weight of 2-butoxy-ethanol. Then 19 parts by weight of this solution was mixed with 2-dimethylamino-ethanol and water, resulting in 100 parts of a clear aqueous solution having a pH of 7.8. This solution, when stored at 40° C., did not show any phase separation until a period of at least 3 months had elapsed.

EXAMPLE III

In the apparatus described in Example I 134 parts by weight of dry 2,2-bis(hydroxymethylbutanol were heated at 120° C. under a stream of dry nitrogen. At this temperature 300 parts by weight of $\alpha,\alpha$-dimethyl-$\beta$-propiolactone were slowly added while stirring. The reaction temperature was kept at 120° C. by cooling. After 8 hours of reaction of 120° C. the acid value of the reaction mixture was 485 meq./100 g. Less than 5% of the lactone was found to be unconverted.

EXAMPLE IV

In the apparatus described in Example I 434 parts by weight of the reaction mixture, as described in Example III, were mixed with 60 parts of 2,2-bis(hydroxymethyl)-1,3-propanediol and 16 parts of 2,2-dimethyl-1,3-propanediol. The reaction mixture was stirred and heated to 230° C. for 2 hours, in which period 22 ml. of water were collected. The acid value of the reaction mixture thus obtained was 160 meq./100 g. The reaction mixture was then diluted with 122 parts of 2-butoxy-ethanol. By adding triethyl amine and water to resulting solution a 15% aqueous solution of neutralized resin having a pH of 8.5 was prepared, which solution after storage at 40° C. was stable for at least 3 months.

EXAMPLE V

In the apparatus described in Example I 434 parts by weight of the reaction mixture as described in Example III were mixed with 306 parts of 2,2-bis-(hydroxymethyl) butanol under a stream of nitrogen. The mixture was stirred and heated to 230° C. for 8 hours, in which period 9 ml. of water were collected. The acid value of the reaction product was 10 meq./100 g., while the hydroxyl content amounted to 674 meq./100 g. Subsequently, the temperature of the reaction mixture was lowered to 140° C., whereupon 183 parts of α,α-dimethyl-β-propiolactone were added. After a reaction period of 3 hours at 140° C. the acid value of the reaction mixture was 127 meq./100 g. The reaction mixture was then diluted with 228 parts of 2-butoxy ethanol. By blending 19 parts by weight of this mixture with 2.9 parts of triethanol amine and 78 parts of water a clear solution was obtained which, when stored at 40° C., did not show any phase separation within 3 months.

EXAMPLE VI

In the apparatus described in Example I 94 parts by weight of dry 2,2-bis(hydroxymethyl)-butanol were mixed with 41 parts by weight of dry 2,2-bis(hydroxymethyl)-1,3-propanediol. The mixture was stirred and heated to 120° C. under a stream of dry nitrogen. At this temperature and still under nitrogen, 462 parts by weight of α,α-dimethyl-β-propiolactone were slowly added, whereupon the reaction mixture was maintained at 120° C. for one hour, whilst stirring was continued. In 15 minutes the reaction temperature was increased to 140° C. and kept at this temperature for one hour with cooling. Then the reaction temperature was lowered to 120° C. whilst stirring and nitrogen blanketing were still continued. After 24 hours of reaction at 120° C. the acid value of the reaction mixture was 455 meq./100 g. Less than 5% of the lactone was found to be unconverted.

EXAMPLE VII

In the apparatus described in Extmple I 597 parts by weight of the reaction as described in Example VI were mixed with 102 parts by weight of 2,2-bis(hydroxymethyl)-1,3-propane diol and 614 parts by weight of the reaction product of 2 moles of "Cardura"-E and 1 mol of diphenylolpropane. The reaction mixture was stirred and heated to 230° C. for 2 hours in which period 30 ml. of water were collected. The acid value of the reaction mixture thus obtained was 70 meq./100 g. Subsequently the reaction mixture was diluted with 320 parts of 2-butoxy-ethanol. By adding dimethyl-ethanol amine and water to this solution a 15% by weight aqueous solution of neutralized resin having a pH of 8.3 was prepared, which solution after storage at 40° C. was stable for at least 3 months.

We claim as our invention:

1. A compound having at least one structural unit of the formula:

$$-\overset{|}{C}-O-\left[-\overset{|}{C}-\overset{\overset{|}{\underset{|}{-C-}}}{\underset{\underset{|}{-C-}}{C}}-\overset{O}{\overset{\|}{C}}-O-\right]_n-\overset{|}{C}-\overset{\overset{|}{\underset{|}{-C-}}}{\underset{\underset{|}{-C-}}{C}}-\overset{O}{\overset{\|}{C}}-O-$$

wherein $n$ is zero or an integer from 1 to 20 and the terminal carbonyloxy group is part of a neutralized or non-neutralized carboxyl group, said compound being the addition reaction product of (1) an alpha-alpha-dihydrocarbyl-beta-propiolactone and (2) an organic polyhydric compound selected from the group consisting of 2,2-bis(hydroxymethyl)-butanol, 2,2-bis(hydroxymethyl) - 1,3-propanediol and mixtures thereof, said reactants being reacted in ratios of from about 0.1 to 3 moles of beta-propiolactone per hydroxyl group of the polyhydric compounds.

2. A compound as in claim 1 wherein the beta-propiolactone in alpha, alpha-dimethyl-beta-propiolactone.

3. A compound as in claim 1 wherein the polyhydric compound is a mixture of 2,2-bis(hydroxymethyl)butanol and up to 75 mole percent of 2,2-bis(hydroxymethyl)-1,3-propanediol.

4. A process for the preparation of a compound having at least one structural unit of the formula:

$$-\overset{|}{C}-O-\left[-\overset{|}{C}-\overset{\overset{|}{\underset{|}{-C-}}}{\underset{\underset{|}{-C-}}{C}}-\overset{O}{\overset{\|}{C}}-O-\right]_n-\overset{|}{C}-\overset{\overset{|}{\underset{|}{-C-}}}{\underset{\underset{|}{-C-}}{C}}-\overset{O}{\overset{\|}{C}}-O-$$

wherein $n$ is zero or an integer from 1 to 20 and the terminal carbonyloxy group is part of a neutralized or non-neutralized carboxyl group which comprises carrying out an addition reaction between (1) an alpha,alpha-dihydrocarbyl - beta - propiolactone and (2) an organic polyhydric compound selected from the group consisting of 2,2-bis(hydroxymethyl)butanol, 2,2-bis(hydroxymethyl)-1,3-propanediol and mixtures thereof at a temperature between about 50° and 175° C., said reactants being employed in ratios of from about 0.1 to 3 moles of beta-propiolactone per hydroxyl group of the polyhydric compound.

5. A process as in claim 4 wherein the beta-propiolactone is alpha-alpha-dimethyl-beta-propiolactone.

References Cited

UNITED STATES PATENTS

| 3,140,267 | 7/1964 | Bortnek et al. | 260—22 |
| 3,222,312 | 12/1965 | Wyart et al. | 260—30.4 |
| 3,299,171 | 1/1967 | Knobloch et al. | 260—78.3 |

FOREIGN PATENTS

| 1,090,780 | 11/1967 | Great Britain | 260—78.3 |
| 1,102,638 | 2/1968 | Great Britain | 260—78.3 |
| 24,289/64 | 10/1964 | Japan | 260—78.3 |

OTHER REFERENCES

Chemical Abstracts, vol. 55, No. 13, June 26, 1961, pp. 12872i–12873d.

Chemical Abstracts, vol. 56, No. 1, Jan. 8, 1962, p. 317f.

DONALD E. CZAJA, Primary Examiner

R. W. GRIFFIN, Assistant Examiner

U.S. Cl. X.R.

117—161; 260—22, 29.2, 32.6, 33.4, 75, 842, 850